United States Patent
Elisha

(10) Patent No.: US 9,851,988 B1
(45) Date of Patent: Dec. 26, 2017

(54) RECOMMENDING COMPUTER SIZES FOR AUTOMATICALLY SCALABLE COMPUTER GROUPS

(71) Applicant: Amazon Technologies, Inc., Reno, NV (US)

(72) Inventor: Simon Jeremy Elisha, Melbourne (AU)

(73) Assignee: Amazon Technologies, Inc., Seattle, WA (US)

( * ) Notice: Subject to any disclaimer, the term of this patent is extended or adjusted under 35 U.S.C. 154(b) by 1149 days.

(21) Appl. No.: 14/018,237

(22) Filed: Sep. 4, 2013

(51) Int. Cl.
*G06F 9/455* (2006.01)

(52) U.S. Cl.
CPC .................. *G06F 9/45533* (2013.01)

(58) Field of Classification Search
None
See application file for complete search history.

(56) References Cited

U.S. PATENT DOCUMENTS

| | | | | |
|---|---|---|---|---|
| 8,266,616 B1* | 9/2012 | Jacquot | ............... | G06F 8/65 717/121 |
| 8,296,434 B1* | 10/2012 | Miller | ............... | H04L 67/1029 709/220 |
| 8,856,797 B1* | 10/2014 | Siddiqui | ............... | G06F 9/46 718/104 |
| 9,280,390 B2* | 3/2016 | Sirota | ............... | G06F 9/5061 |
| 9,286,051 B2* | 3/2016 | Bennah | ............... | G06F 8/63 |
| 9,372,735 B2* | 6/2016 | Calder | ............... | G06F 9/5077 |
| 2010/0275212 A1* | 10/2010 | Saha | ............... | G06F 9/5027 718/104 |
| 2012/0005318 A1* | 1/2012 | Beaty | ............... | H04L 41/0672 709/221 |
| 2013/0006692 A1* | 1/2013 | Hans | ............... | G06Q 10/06311 705/7.22 |
| 2013/0055283 A1* | 2/2013 | Mopur | ............... | G06F 9/5083 718/104 |
| 2013/0339956 A1* | 12/2013 | Murase | ............... | G06F 9/505 718/1 |
| 2014/0026122 A1* | 1/2014 | Markande | ............... | G06F 11/3664 717/124 |
| 2014/0058871 A1* | 2/2014 | Marr | ............... | G06F 9/45533 705/26.1 |
| 2014/0101428 A1* | 4/2014 | Bennah | ............... | G06F 8/63 713/100 |
| 2015/0234671 A1* | 8/2015 | Tomita | ............... | G06F 9/45558 718/1 |
| 2016/0239322 A1* | 8/2016 | Watanabe | ............... | G06F 9/45558 |

* cited by examiner

*Primary Examiner* — Lewis A Bullock, Jr.
*Assistant Examiner* — Kevin X Lu
(74) *Attorney, Agent, or Firm* — Lee & Hayes, PLLC

(57) ABSTRACT

Computers within automatically scalable virtual computer groups are automatically added and removed based on workload conditions. New computers are created with compute capacities or sizes that define the resources that form the computers. A capacity recommendation engine may be configured to monitor information surrounding scaling events to determine resulting utilization of scalable virtual computer groups, and to provide recommendations regarding compute capacity. The recommendations may be designed to balance cost and responsiveness.

18 Claims, 3 Drawing Sheets

RECOMMENDING COMPUTER SIZES FOR AUTOMATICALLY SCALABLE COMPUTER GROUPS

BACKGROUND

Large-scale, network-based computing represents a paradigm shift from traditional client-server computing relationships. With large-scale, network-based service platforms, customers are able to leverage shared resources on demand by renting resources that are owned by third parties and that reside "in the cloud." With these resources, users of the platform are able to launch and maintain large applications without actually owning or servicing the underlying infrastructure necessary for these applications. As a result, network-based service platforms have expanded the class of individuals and companies able to effectively compete in the realm of computing applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, components, and techniques for optimizing certain aspects of computer groups that are implemented in online or network-accessible computing infrastructures, including virtual computing infrastructures. More specifically, a scalable computer group may be used to service a variable workload such web site traffic that varies over time. Automatic scaling may be used in these situations to automatically increase or decrease the number of virtual computers in the computer group in response to increasing or decreasing workload demands.

When a virtual computer is launched and added to a computer group, the virtual computer is configured to have a particular compute capacity. The compute capacity defines the size, amount, and/or quality of resources that make up or are available to the virtual computer, such as number of processors, processor capabilities, network capabilities, memory size, and so forth. The compute capacity may be specified by the customer of the infrastructure services.

As described in more detail below, a recommended compute capacity may be provided or automatically implemented based on an evaluation of performance information relating to previous scaling activities. For example, analyzing previous scaling activities may indicate that a larger compute size would reduce the frequency of future scaling occurrences and/or reduce customer costs. Alternatively, analyzing previous scaling activities may indicate that a smaller compute size would be adequate to address expected workload changes while also reducing customer costs.

The recommended compute capacity may be provided to the customer through an infrastructure interface, and the customer may then implement the recommendation manually. Alternatively, the infrastructure service may be directed to periodically calculate and implement the recommended compute capacity without direct customer intervention.

Figure 1:
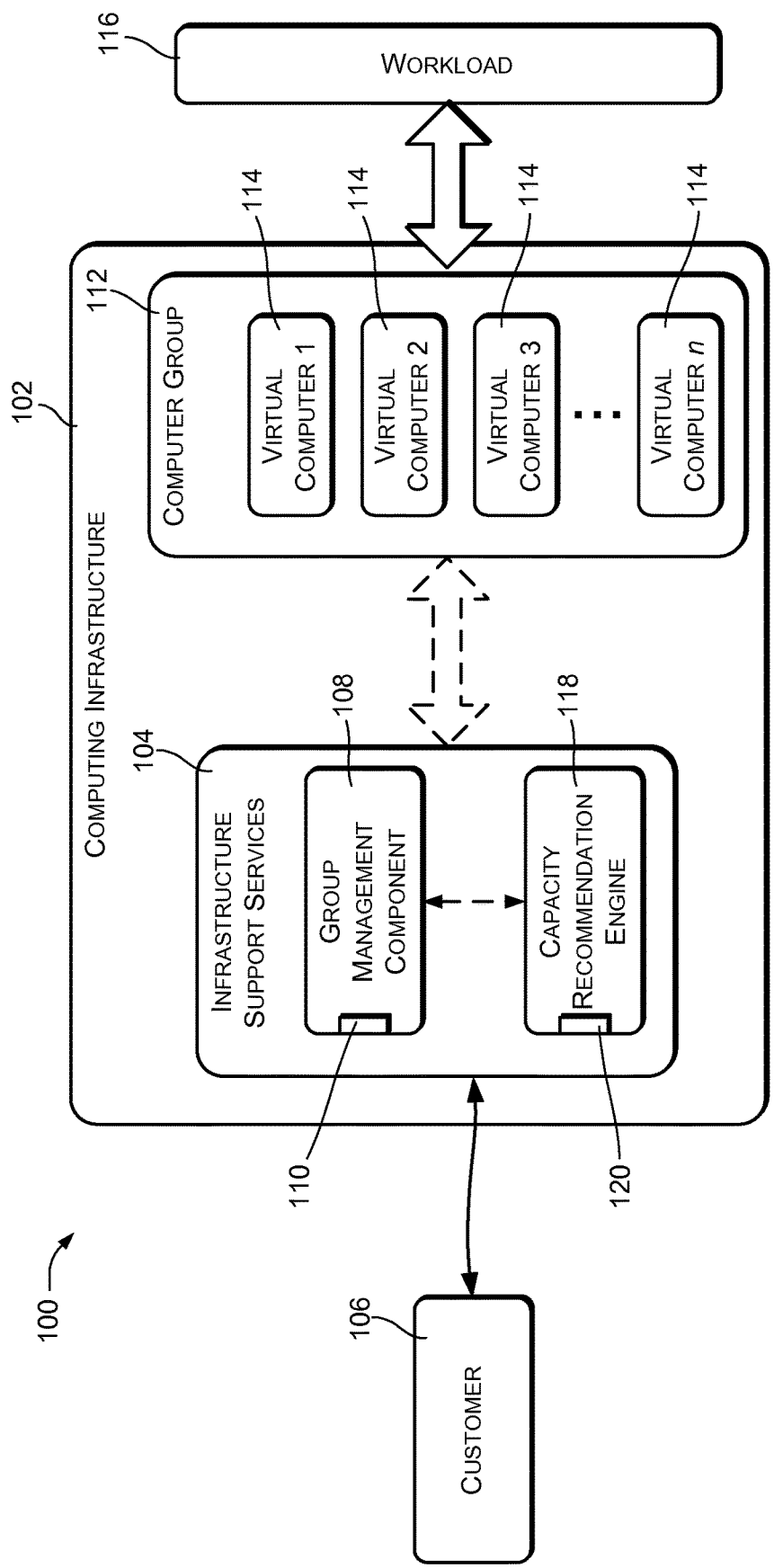
FIG. 1 is a block diagram illustrating an example environment within which recommendations may be provided regarding sizes of virtual computers added to automatically scalable computer groups.

FIG. 1 illustrates an example environment 100 for calculating, providing, and or implementing compute capacity recommendations in conjunction with automatically scaling virtual computer groups. The environment of FIG. 1 includes an online or network-based computing infrastructure 102, which may provide a wide variety of computing resources. The network-based computing infrastructure 102 may be referred to as a virtual computing infrastructure, an Infrastructure as a Service (IaaS), and/or a Platform as a Service (PaaS). Resources supported or provided by the computing infrastructure 102 may include dedicated servers, shared servers, virtual servers, server slices, processors, processor cycles, storage, memory, and so forth. The resources may be available in scalable increments or amounts, which can be dynamically increased or decreased in response to usage and/or demand.

A computing infrastructure such as the computing infrastructure 102 of FIG. 1 typically provides various types of administrative and support services 104. The support services 104 allow creation, modification, and deletion of infrastructure resources such as virtual computers, virtual computer groups, automatically scalable virtual computer groups, network components, storage units, etc. The support services 104 may also be queried to obtain operational status and metrics regarding resources.

The support services 104 may be accessible to customers or users through interactive interfaces. The support services 104 may also, or alternatively, be accessible to applications and other logical elements through programmatic means. For example, administrative clients of a customer 106, such as computers and servers of the customer 106, may access the support services 104 through such APIs (application program interfaces) exposed by the infrastructure support services 104 or by elements of the infrastructure support services 104.

In addition to various other types of management components, the support services 104 may implement a virtual computer group management component 108 that is accessible to the customer 106 through an API (application programming interface) or other interface 110 to create and manage automatically scalable computer groups. An example of an automatically scalable computer group is shown in FIG. 1, referred to as a computer group 112. The scalable computer group 112 has a dynamically variable number n of virtual computers 114. The virtual computers 114 of the computer group 112 are configured to service a workload 116 that potentially varies over time. More specifically, the number n of virtual computers within the group 112 is increased and decreased in response to changes in the workload 116.

The virtual computers 114 of the computer group 112 may be configured, as an example, to implement a website, and the workload 116 may comprise website requests or traffic. During certain times of the day, website traffic may increase, resulting in additional virtual computers 114 being launched and added to the group 112. At other times, website traffic may decrease, resulting in one or more of the virtual computers 114 being terminated and removed from the group 112. Website traffic may also increase or decrease over larger periods of time, as the website gains users or becomes more popular.

The infrastructure support services 104 may also include a capacity recommendation engine 118 that observes various performance metrics of the computer group 112 and provides recommendations regarding optimal compute capacities of the individual virtual computers 114 of the computer group 112. The recommended compute capacities may be made available to the customer 106 at an API or other interface 120 or may be used by the group management component 108 when launching new virtual computers 114 within the group 112.

Generally, the various components of the infrastructure support services 104, including the group management component 108 and the capacity recommendation engine 118, may be accessible through various programmatic means, including function calls, APIs, HTTP (hypertext transfer protocol) interfaces, and so forth. In some embodiments the support services 104 may be configured to interact with customers according to a web services model, and the components of the support services 104 may be implemented as web services. A web service may comprise any type of computing service that is made available to a requesting client via a request interface that includes one or more Internet-based application layer data transport protocols, such as a version of the Hypertext Transport Protocol (HTTP) or another suitable protocol. In this embodiment, components of the infrastructure 102 may expose web services endpoints having Uniform Resource Locators (URLs), e.g., http://storageservice.domain.com. Clients may interact with the components of the infrastructure 102 through the corresponding web services endpoints.

More specifically, the group management component 108 and the capacity recommendation engine 118 may be implemented as web services. The interface 110 of the group management component 108 and the interface 120 of the capacity recommendation engine 118 may comprise web services endpoints. The group management component 108 and the capacity recommendation engine 118 may expose additional web services endpoints that are not specifically shown.

Web services such as these may be implemented in a variety of architectural styles, using a variety of enabling service protocols. For example, in a Representational State Transfer (REST)-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In some implementations, REST-style web services architectures are stateless, in that each web services call may contain all the information necessary to process that call without reference to external state information. In contrast to REST-style web services architectures, document-based or message-based web services architectures may encode the parameters and data pertinent to a web services call as a document that may be transmitted to a web services endpoint and then decoded and acted upon by the endpoint. For example, a version of eXtensible Markup Language (XML) or another suitable markup language may be used to format the web services request document. In some embodiments, the markup language used to format the request document may delimit parameters that control the processing of the request, while in other embodiments certain features of the markup language itself (e.g., certain tags) may directly control aspects of request processing. Additionally, in some embodiments the resulting document may be encapsulated within another protocol, such as a version of the Simple Object Access Protocol (SOAP), for example, in order to facilitate processing of the web services request by the endpoint.

Other protocols may also be employed within various embodiments of web services architectures. For example, a version of Web Services Description Language (WSDL) may be employed by a web services endpoint to publish its interfacing requirements to potential clients. Web services endpoints may make themselves known to potential clients through a directory protocol such as a version of the Universal Description, Discovery and Integration (UDDI) protocol. Numerous other types of protocols relating to the provision of computing services via web services interfaces may exist, and any given web services implementation may use any suitable combination of such protocols.

It is contemplated that in some embodiments, the support services 104 and its components may support interfaces other than web services interfaces, instead of or in addition to web services interfaces. For example, an enterprise may implement a particular service for use by clients external to the enterprise, who may access the service via web services protocols, as well as users within the enterprise, who may use a different type of interface (e.g., a proprietary interface customized to the enterprise's intranet). In some embodiments, the components of the support services 104 may support each of the various types of interfacing protocols through which any user of the storage service may access the service. In other embodiments, different instances of individual components may be provided for each distinct interface approach.

Figure 2:
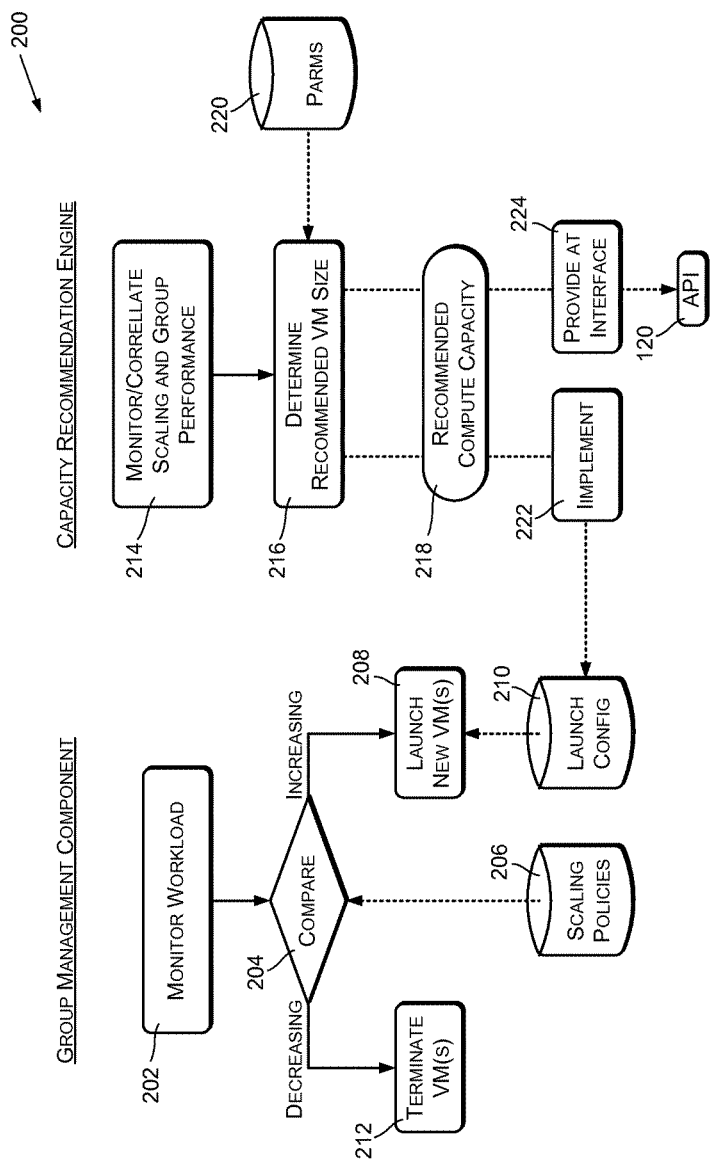
FIG. 2 is a flow diagram illustrating the management of automatically scalable computer groups and the determination of recommended virtual computer sizes for use in conjunction with such scalable computer groups.

FIG. 2 illustrates an example method 200 that may be performed by the group management component 108 and the capacity recommendation engine 118. The actions on the left side of FIG. 2 are performed by the group management component 108. The actions on the right side of FIG. 2 are performed by the capacity recommendation engine 118. The method 200 may at times be described with reference to the environment shown in FIG. 1, although the method may also be used in other environments.

The group management component 108 performs an action 202 of monitoring the workload 116 of the computer group 112. In practice, this may comprise retrieving operational and/or performance metrics regarding the individual virtual computers 114 of the virtual computer group 112 and/or the workload 116 serviced by the computer group 112. Such metrics may indicate or relate to utilization of the virtual computers 114, such as CPU utilization, memory utilization, network bandwidth utilization, and so forth. Relevant metrics may also include data regarding web requests and/or responses to requests, such as the number or rate of web requests being received and/or serviced by the computer group 112.

An action 204 comprises comparing the monitored metrics regarding utilization of the virtual computers 114 with scaling policies 206. The scaling policies 206 may be provided by the customer 106, and may specify conditions under which scaling should take place. For example, the scaling policies may indicate that upward scaling should take place when the virtual computers 114 of the computer group 112 reach 80% utilization. Similarly, the scaling policies 206 may indicate that downward scaling should take place when utilization of the virtual computers 114 of the computer group 112 falls below 60%. As another example, scaling policies may be defined in terms of the number or rate of web requests being serviced by the computer group 112. The scaling policies may also define time-based schedules for certain types of scaling. The scaling policies may specify additional information related to scaling, such as the number of virtual computers that should be added to or removed from a computer group during a single scaling event.

If the conditions meet specified criteria for scaling, as defined by the scaling policies, an action 208 is performed of launching one or more new virtual computers and adding the new virtual computers to the computer group 112. The number of new virtual computers added to the computer group may in some cases be specified by the scaling policies 206.

When launching a new virtual computer 114, the configuration of the new virtual computer is defined by a launch configuration 210 provided by the customer 106. The launch configuration 210 specifies a memory image for the new virtual computer as well as other information regarding the characteristics of the new virtual computer. Most relevant to the present discussion, the launch configuration 210 specifies a compute capacity for the new virtual computer. The compute capacity, sometimes referred to as the "size" of the virtual computer, specifies the capabilities, amounts, sizes, properties, and/or qualities of the resources used to create the new virtual computer. As examples, the compute capacity may specify the number of processors or cores that will be used to implement the new virtual computer, the capabilities or types of the processors, network capabilities or capacities available to the virtual computer, memory size of the new virtual computer, local storage capacity of the new virtual computer, local storage performance of the new virtual computer, and so forth. In certain environments, there may be a limited number of predefined compute capacities from which the customer may choose. Generally, a virtual computer with a higher compute capacity is more costly to the customer, but is capable of servicing a relatively larger workload. A smaller compute capacity is less expensive, but is capable only of servicing relatively smaller workloads.

If the workload has decreased as defined by the scaling policies 206, an action 212 is performed of terminating and/or removing one or more new virtual computers 114 from the computer group 112. The number of virtual computers 114 removed from the computer group 112 may in some cases by specified or influenced by the scaling policies 206.

In accordance with the actions described above, the compute capacity defined by the launch configuration 210 is the unit by which scaling takes place. In certain situations, the selected compute capacity may result in scaling increments that are either to large or too small for actual conditions. A relatively large compute capacity may result in a situation where a virtual computer is added to the computer group but is subsequently underutilized. On the other hand, a relatively small compute capacity may result in a situation where adding a virtual computer to the computer group does not adequately address the increased workload, which may in turn result in lowered responsiveness to web requests or other workload demands.

The actions on the right of FIG. 2 are performed by the capacity recommendation engine 118 in order to recommend a compute capacity that optimizes the competing goals of cost minimization and responsiveness to increasing workloads. Note that the actions of the capacity recommendation engine 118 are performed asynchronously to the actions of the group management component 108.

An action 214 comprises monitoring information related to scaling and performance of the computer group 112 and correlating performance information with scaling occurrences. Scaling information may include or describe scaling activities or occurrences. For example, scaling information may indicate the chronological times at which scaling occurred and the number of virtual computers 114 that were added or removed in each scaling occurrence. Performance information may include capacity utilization metrics and other metrics relating to capacity, utilization, responsiveness, and/or performance of the virtual computers 114 and/or of the computer group 112 as a whole.

Utilization metrics may indicate utilization amounts of processors, memory, network bandwidth, local storage performance, and so forth over time, particularly during times subsequent to scaling occurrences. Other utilization metrics may include, as examples, numbers of users of an application, current response or transaction times, memory cache or heap size, number of execution threads, database size, number of pending requests for data, and so forth.

The correlated scaling and performance information may be recorded and logged over time, or may be obtained as historical data from components of the infrastructure 102, including the group management component 108. The scaling and utilization information are time-correlated with each other in order to observe time relationships between individual scaling occurrences and resulting performance and utilization metrics of the computer group 112.

An action 216 comprise determining a recommended compute capacity 218 for virtual computers added to the computer group 112, based on the correlated scaling and utilization information. The recommended compute capacity 218 may be determined in various ways. Generally, the recommendation engine 118 determines the recommended compute capacity 218 based on observed performance of the computer group 112 subsequent to adding or removing one or more virtual computers. As an example, the recommendation engine 118 may specify a lower recommended compute capacity 218 if the recorded or obtained utilization information indicates (a) at least a given amount of unutilized compute capacity of the virtual computers of the computer group after adding a virtual computer to the computer group or (b) less than a given amount of unutilized compute capacity of the virtual computers of the computer group after removing a virtual computer from the computer group. The recommendation engine 118 may specify a higher recommended compute capacity 218 if the recorded or obtained utilization information indicates (a) less than a given amount of unutilized compute capacity of the virtual computers of the computer group after adding a virtual computer to the computer group or (b) at least a given amount of unutilized compute capacity of the virtual computers of the computer group after removing a virtual computer from the computer group. Such higher and lower virtual computer capacities may be specified in relation to the compute capacity currently being used when adding or launching new virtual machine instances.

In some cases, the historical frequency of scaling occurrences may be used as an indirect indication of computer utilization and workload changes. For example, the compute frequency may be determined based on the number of scaling occurrences that take place during a predetermined period of time, or how many virtual computers are added or subtracted during a predetermined length of time. In such an example, the virtual computer capacity may be selected to reduce the frequency of future scaling occurrences. As a more specific example, it may be determined that upward scaling occurrences are performed frequently, indicating that the capacity of the computer group has been lagging behind demand. In a case such as this, it may be desirable to increase the compute capacity of added new virtual computers in order to decrease the scaling frequency and respond more quickly to increasing workload demand.

In some embodiments, the recommendation engine 118 may reference one or more configuration parameters 220 when calculating a recommended compute capacity. The configuration parameters 220 may indicate utilization thresholds or ranges of desirable utilization metrics that the recommendation engine 118 may use to evaluate whether computer capacities should be increased or decreased relative to the compute capacities of existing virtual computers 114 of the computer group 112. As a more specific example, the configuration parameters 220 may indicate that newly added virtual computers should ideally operate at 50% to 80% utilization after being added to the computer group, and that the compute capacity should be adjusted if the actual utilization after a scaling event falls outside of this range.

In addition, the configuration parameters 220 may specify the specific metrics that should be evaluated when determining whether virtual computers of the group 112 are operating within intended ranges. The customer may specify that computer group utilization should be evaluated in various different ways, including by evaluating one or more of processor utilization, memory utilization, network bandwidth utilization, numbers of users of an application, current response or transaction times, memory cache or heap size, number of execution threads, number of pending requests for data, and so forth. The configuration parameters 220 may be tuned over time by the customer 106.

The capacity recommendation engine 118 may automatically implement the recommended compute capacity by modifying the launch configuration 210 in an action 222. Alternatively, the capacity recommendation engine 118 may perform an action 224 of providing the recommended compute capacity 218 at a programmatic interface such as the interface 120.

Figure 3:
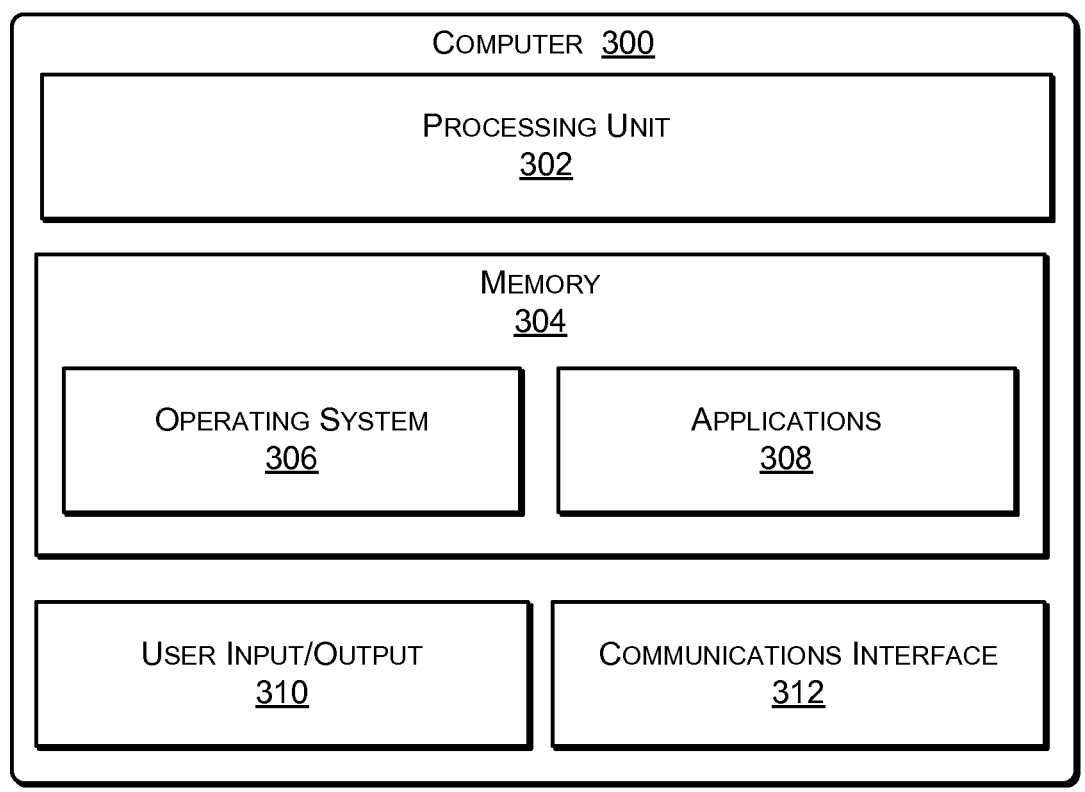
FIG. 3 is a block diagram showing high-level components of an example computer that may be used in conjunction with the systems and techniques described herein.

FIG. 3 shows relevant components of an example computer 300 that may be used to implement physical and/or virtual servers and computers of the computing infrastructure 102. The various entities described above may of course be implemented in many different ways.

The example computer 300 may comprise one or more processing units 302 and one or more forms of computer-readable memory 304. The memory 304 may comprise volatile and nonvolatile memory. Thus, the memory 304 may include, but is not limited to, RAM, ROM, EEPROM, flash memory, or other memory technology, or any other medium which can be used to store applications and data. The memory 304 may also include removable media such as optical disks, portable devices/drives, and so forth.

The memory 304 may be used to store any number of functional components, such as programs and program modules that are executable on the processing unit 302. For example, the memory 304 may store an operating system 306 and various applications or user-specified programs 308. The operating system 306 and/or the user-specified programs 308 may include components, modules, and/or logic for performing the actions described herein. More specifically, executable components stored in the memory 304 may comprise computer-executable instructions that, when executed, cause the one or more processing units 302 to perform acts and to implement techniques described herein.

The computer 300 may also have user input/output components 310, such as a display, keyboard, mouse, etc. The computer 300 may also comprise a communications interface 312 such as a network interface.

Generally, the functionality described herein may be implemented by one or more computers such as shown by FIG. 3 or by similar devices, with the various actions described above distributed in various ways across the different computers. Computers of the computing infrastructure 102 may be located together or separately, and organized as virtual servers, server banks, and/or server farms. The described functionality may be provided by the computers of a single entity or enterprise, or may utilize the computers and/or services of multiple entities or enterprises.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more tangible, non-transitory computer-readable media storing computer-executable instructions that, when executed, cause one or more processors to perform acts comprising:
   operating a computer group in a virtual computer infrastructure to service a changing workload, wherein the computer group has a variable number of virtual computers;
   adding a first virtual computer to the computer group based on a launch configuration specifying a first compute capacity, the adding of the first virtual computer responsive to an increase in the changing workload, the added first virtual computer having the first compute capacity;

removing a second virtual computer from the computer group in response to a decrease in the changing workload;

obtaining utilization information for the computer group, the utilization information indicating an amount of utilization of the virtual computers of the computer group subsequent to the adding of the first virtual computer and the removing of the second virtual computer;

determining a recommended second compute capacity based at least in part on the obtained utilization information, wherein the first compute capacity and the recommended second compute capacity differ;

modifying the launch configuration to specify the recommended second compute capacity; and adding, subsequent to modifying the launch configuration, a third virtual computer to the computer group based on the modified launch configuration, the adding of the third virtual computer responsive to an increase in the changing workload, the added third virtual computer having the recommended second compute capacity.

2. The one or more tangible, non-transitory computer-readable media of claim 1, wherein the first compute capacity and the recommended second compute capacity specify one or more of:
number of processors;
processor capabilities;
network capabilities
local storage capacity
local storage performance; or
memory size.

3. The one or more tangible, non-transitory computer-readable media of claim 1, wherein the obtained utilization information further indicates one or more of the following:
additions of virtual computers to the computer group in response to increases in the changing workload; or
removals of virtual computers from the computer group in response to decreases in the changing workload.

4. The one or more tangible, non-transitory computer-readable media of claim 1, wherein the amount of utilization indicates one or more of the following:
processor utilization;
memory utilization
storage performance utilization; or
network bandwidth utilization.

5. The one or more tangible, non-transitory computer-readable media of claim 1, wherein the determining is further based in part on how many virtual computers are added to and removed from the computer group within a predetermined length of time.

6. The one or more tangible, non-transitory computer-readable media of claim 1, wherein the determining comprises:
specifying a lower recommended second compute capacity than the specified first compute capacity if the obtained utilization information indicates (a) at least a given amount of unutilized compute capacity of the virtual computers of the computer group after adding a virtual computer to the computer group or (b) less than a given amount of unutilized compute capacity of the virtual computers of the computer group after removing a virtual computer from the computer group; and
specifying a higher recommended second compute capacity than the first compute capacity if the obtained utilization information indicates (a) less than a given amount of unutilized compute capacity of the virtual computers of the computer group after adding a virtual computer to the computer group or (b) at least a given amount of unutilized compute capacity of the virtual computers of the computer group after removing a virtual computer from the computer group.

7. A method, comprising:
adding, in response to at least in part on a first increase in a changing workload, a first virtual computer to an automatically scaling computer group, the first virtual computer having a first compute capacity specified in a launch configuration;

removing a second virtual computer from the automatically scaling computer group in response to at least in part on a decrease in the changing workload;

obtaining historical information for the automatically scaling computer group, wherein the historical information indicates utilization of the automatically scaling computer group after the adding of the first virtual computer and the removing of the second virtual computer;

determining, based at least in part on the obtained historical information, a recommended second compute capacity for the automatically scaling computer group, wherein the first compute capacity and the recommended second compute capacity differ;

modifying the launch configuration to specify the recommended second compute capacity; and adding, in response to at least in part on a second increase in the changing workload, a third virtual computer to the automatically scaling computer group using the modified launch configuration, wherein the third virtual computer has the recommended second compute capacity.

8. The method of claim 7, wherein determining the recommended second compute capacity comprises determining a compute capacity that decreases costs projected to be incurred by the computer group over multiple scaling occurrences.

9. The method of claim 7, wherein determining the recommended second compute capacity comprises determining a compute capacity that results in a reduction of a frequency of future scaling occurrences of the computer group.

10. The method of claim 7, wherein determining the recommended second compute capacity is based at least in part on how many scaling occurrences take place within a predetermined period.

11. The method of claim 7, wherein:
the historical information indicates capacity utilization metrics regarding the first virtual computers of the computer group; and
determining the recommended second compute capacity is based at least in part on the capacity utilization metrics.

12. The method of claim 7, further comprising providing the recommended second compute capacity at a programmatic interface.

13. The method of claim 7, wherein the first compute capacity and the second recommended compute capacity specify one or more of:
number of processors;
processor capabilities;
network capabilities
local storage capacity
local storage performance; or
memory size.

14. The method of claim 7, wherein the historical information indicates one or more of the following:
   processor utilization;
   memory utilization
   storage performance utilization; or
   network bandwidth utilization.

15. A system comprising:
   a plurality of computer servers operating:
      a scalable computer group configured to service a varying workload, the scalable computer group scaled by:
         adding a first virtual computer launched with a first compute capacity in response to a first increase to the varying workload, the first compute capacity specified in a launch configuration,
         removing a second virtual computer in response to a decrease to the varying workload, and
         adding, in response to at least in part on a second increase to the varying workload, a third virtual computer using a modified launch configuration, the added third virtual computer having a recommended second compute capacity;
      a recommendation engine configured to:
         obtain historical information regarding utilization of the scalable computer group subsequent to adding the first virtual computer to the scalable computer group and removing the second virtual computer from the scalable computer group;
         determine the recommended second compute capacity for the third virtual computer based at least in part on the historical information, wherein the first compute capacity and the recommended second compute capacity differ; and
         create the modified launch configuration by modifying the launch configuration to specify the recommended second compute capacity.

16. The system of claim 15, wherein the recommendation engine is further configured to expose one or more interfaces that are accessible by a client computer to obtain the recommended second compute capacity.

17. The system of claim 15, wherein the scalable computer group is configured to scale upwardly by adding new virtual computers having the recommended second compute capacity.

18. The system of claim 15, wherein the recommended second compute capacity is further based at least in part on costs that are projected to be incurred by the scalable computer group when scaling with virtual computers having the recommended second compute capacity.

* * * * *